(12) United States Patent
Kiely et al.

(10) Patent No.: US 11,277,216 B2
(45) Date of Patent: Mar. 15, 2022

(54) SYSTEM AND METHOD FOR GENERATING AN AUDIO FILE

(71) Applicant: Xhail Ireland Limited, County Dublin (IE)

(72) Inventors: Michael John Kiely, County Dublin (IE); Conor Tee, County Wexford (IE)

(73) Assignee: Xhail Ireland Limited, County Dublin (IE)

( * ) Notice: Subject to any disclaimer, the term of this patent is extended or adjusted under 35 U.S.C. 154(b) by 0 days.

(21) Appl. No.: 17/461,752

(22) Filed: Aug. 30, 2021

(65) Prior Publication Data

US 2022/0052773 A1 Feb. 17, 2022

Related U.S. Application Data

(63) Continuation of application No. 17/071,295, filed on Oct. 15, 2020, which is a continuation of application
(Continued)

(30) Foreign Application Priority Data

Apr. 9, 2013 (IE) .................................. S2013/0120

(51) Int. Cl.
*H04H 60/04* (2008.01)
*G11B 27/031* (2006.01)
*G10H 1/00* (2006.01)
*G06F 3/16* (2006.01)

(52) U.S. Cl.
CPC ............. *H04H 60/04* (2013.01); *G06F 3/162* (2013.01); *G10H 1/0025* (2013.01);
(Continued)

(58) Field of Classification Search
CPC ............... G10H 1/0066; G10H 1/0025; G10H 2210/021; G10H 2240/131;
(Continued)

(56) References Cited

U.S. PATENT DOCUMENTS 5,467,288 A 11/1995 Fasciano
5,876,213 A 3/1999 Matsumoto
(Continued)

FOREIGN PATENT DOCUMENTS

CA 2259369 1/1998
CA 2663485 10/2009
(Continued)

OTHER PUBLICATIONS

Patent Office of India, "Office Action", in Application No. 3182/MUMNP/2015, dated Oct. 21, 2021, 2 pages.
(Continued)

*Primary Examiner* — Brenda C Bernardi
(74) *Attorney, Agent, or Firm* — Hickman Becker Bingham Ledesma LLP

(57) ABSTRACT

A system and method for synchronizing an audio or MIDI file with a video file are provided. The method includes receiving a first audio or MIDI file, receiving a video file, and operating an audio synchronization module to perform steps of synchronizing the first audio or MIDI file with the video file, marking an event in the video file at a point on a timeline, detecting a first musical key for the event, retrieving a musical stinger or swell from a library, in which the musical stinger or swell is a second audio or MIDI file and is tagged with a second musical key, and the second musical key is relevant to the first musical key, and placing the musical stinger or swell at the point of the timeline marked for the event.

30 Claims, 21 Drawing Sheets

Related U.S. Application Data

No. 15/799,956, filed on Oct. 31, 2017, now Pat. No. 10,812,208, which is a continuation of application No. 15/191,490, filed on Jun. 23, 2016, now Pat. No. 9,843,404, which is a continuation of application No. 14/248,700, filed on Apr. 9, 2014, now Pat. No. 9,390,696.

(52) U.S. Cl.
CPC ......... *G10H 1/0066* (2013.01); *G11B 27/031* (2013.01); *G10H 2210/021* (2013.01); *G10H 2210/125* (2013.01); *G10H 2220/101* (2013.01); *G10H 2220/106* (2013.01); *G10H 2220/126* (2013.01); *G10H 2240/056* (2013.01); *G10H 2240/081* (2013.01); *G10H 2240/085* (2013.01); *G10H 2240/131* (2013.01); *G10H 2240/325* (2013.01)

(58) Field of Classification Search
CPC ....... G10H 2240/056; G10H 2210/125; G10H 2220/126; G10H 2220/101; G10H 2240/081; G10H 2240/085; G10H 2240/325; G06F 3/162; G11B 27/031; H04H 60/04

See application file for complete search history.

(56) References Cited

U.S. PATENT DOCUMENTS

| | | |
|---|---|---|
| 7,191,023 B2 | 3/2007 | Williams |
| 9,286,876 B1 | 3/2016 | Dabby |
| 10,679,596 B2 | 6/2020 | Balassanian |
| 10,930,296 B2 | 2/2021 | Cook |
| 2005/0223879 A1 | 10/2005 | Huffman |
| 2006/0230910 A1 | 10/2006 | Song |
| 2010/0131086 A1 | 5/2010 | Itoyama |
| 2010/0192755 A1 | 8/2010 | Morris |
| 2010/0250510 A1 | 9/2010 | Herberger |
| 2010/0257994 A1 | 10/2010 | Hufford |
| 2010/0272054 A1 | 10/2010 | Tatsuta |
| 2011/0175915 A1 | 7/2011 | Gehring |
| 2012/0089390 A1 | 4/2012 | Yang |
| 2012/0151344 A1 | 6/2012 | Humphrey |
| 2012/0303617 A1 | 11/2012 | Elliot |
| 2013/0254076 A1 | 9/2013 | Thomas |
| 2014/0121797 A1 | 5/2014 | Ales |
| 2018/0046709 A1 | 2/2018 | Roy |
| 2020/0074966 A1 | 3/2020 | Sugar |
| 2020/0126524 A1 | 4/2020 | Sheppard |

FOREIGN PATENT DOCUMENTS

| | | |
|---|---|---|
| EP | 2073193 | 6/2009 |
| EP | 3389028 | 10/2018 |
| GB | 2551807 | 1/2018 |
| WO | WO 9721210 | 6/1997 |
| WO | WO 9802867 | 1/1998 |
| WO | WO 2013/028315 | 2/2013 |

OTHER PUBLICATIONS

European Patent Office, "Examination Report", in Application No. 19713370.5, dated Jul. 8, 2021, 7 pages.

Current Claims, in Application No. 19713370.5, dated Apr. 28, 2021, 4 pages.

SECOND GENERATION MUSIC CUES

| STEM TAG NUMBER | CRAZY HORSE (40) | RODEO BILL (41) | YELLOW TEXAS (42) |
|---|---|---|---|
| PIANO | CT2-P207-DW | CT2-P210-PC | CT2-P212-MK |
| ACOUSTIC GUITAR | CT2-AG211-BK | CT2-AG205-GD | CT2-AG205-GD |
| BASS | CT2-B202-FJ | CT2-B208-BK | CT2-B202-FJ |
| DRUMS | CT2-D208-GG | CT2-D203-FJ | CT2-D210-HT |
| SYNTH | CT2-S211-SC | CT2-S208-FD | CT2-S213-SC |
| GUITAR | CT2-G206-DC | CT2-G212-MK | CT2-G203-BB |
| FIDDLE | CT2-F208-FH | CT2-F207-SG | CT2-F202-FD |
| BANJO | CT2-B210-BK | CT2-B2214-FJ | CT2-B206-SD |
| LAP STEEL | CT2-LS207-BB | CT2-LS210-DC | CT2-LS202-SG |

FIG. 11

SYSTEM AND METHOD FOR GENERATING AN AUDIO FILE

CROSS-REFERENCE TO RELATED APPLICATIONS; BENEFIT CLAIM

This application claims the benefit as a Continuation of application Ser. No. 17/071,295 filed Oct. 15, 2020; which is a Continuation of application Ser. No. 15/799,956 filed Oct. 31, 2017, now U.S. Pat. No. 10,812,208; which is a Continuation of application Ser. No. 15/191,490, filed Jun. 23, 2016, now U.S. Pat. No. 9,843,404; which is a Continuation of application Ser. No. 14/248,700, filed Apr. 9, 2014, now U.S. Pat. No. 9,390,696; the entire contents of which is hereby incorporated by reference as if fully set forth herein, under 35 U.S.C. § 120. The applicant hereby rescinds any disclaimer of claim scope in the parent applications or the prosecution history thereof and advises the USPTO that the claims in this application may be broader than any claim in any of the parent applications.

This application claims priority to Irish Patent Application No. S2013/0120 filed Apr. 9, 2013, the entire contents of which are hereby incorporated by reference as if fully set forth herein for all purposes.

The present invention relates to a system and method for generating an audio output file.

Digital audio workstations (DAWs) have been developed to provide users with a production environment in which an audio track may be composed, recorded, edited, mixed and then synchronised with target image or video content, including films, television shows, commercials, and/or gaming applications.

Such DAWs typically provide users with the required manipulation tools and a library of pre-recorded audio content which users select, edit and combine as desired to ensure that an audio track produced is aesthetically satisfactory and has the correct timings and length for seamless synchronisation with the target image and video content.

However, the selection of the appropriate pre-recorded audio content for creating an audio track for a film, a scene in a film, a television show, a commercial and/or a gaming application is extremely time consuming, even for the most skilled audio editors, since it is very unlikely that any single piece of pre-recorded audio content will have the appropriate timings and marry aesthetically with the image content with which it is to be synchronised. Moreover, the use and re-use of pre-recorded audio content in a DAW environment leaves open the possibility that audio content produced may not be sufficiently unique.

It is a therefore an object of the present invention to provide a system and method for generating an audio output file which goes at least some way toward overcoming the above problems and/or which will provide the public and/or industry with a useful alternative.

Further aspects of the present invention will become apparent form the ensuing description which is given by way of example only.

According to the invention, there is provided computer implemented method for generating an audio output file, the method including using one or more processors to perform steps of:

receiving audio tracks, each audio track created according to audio parameters;

separating each audio track into at least one selectable audio block, each audio block including audio content from a musical instrument involved in creating the audio track;

assigning a unique identifier to each audio block;

using the unique identifiers to select audio blocks, and generating the audio output file by combining the selected audio blocks.

The present invention provides a method for generating an audio output file in a computer implemented development environment. The invention creates from pre-existing or pre-recorded audio tracks a library of audio content in the form of audio blocks. The stored audio blocks each correspond to an instrument, such as a piano, a drum, a synthesiser and the like, and are grouped for selection based on audio parameters of the audio tracks. The audio parameters comprise one or more of: tempo, genre and harmonic map, and define a music genre template map for an audio track.

The invention implements a tagging or indexing mechanism to associate with each audio block a unique identifier, and compares the unique identifiers for the selected audio blocks with records of other previous combinations of unique identifiers in a storage device to ensure that the combination is new so that a unique audio output file is generated.

Preferably, the step of using the unique identifiers to select audio blocks comprises: selecting a combination of audio blocks such that the unique identifiers for the combination of audio blocks selected is not located in a record of a storage device indicating that the combination is allowable.

Preferably, the step of using the unique identifiers to select audio blocks comprises: comparing the unique identifiers of the selected audio blocks with records in a storage device, such that if a record of a combination of the unique identifiers is located then an audio output file is not generated, and if a record of the combination of unique identifiers is not located then the selected audio blocks are combined to generate an audio output file.

In another embodiment of the invention, the method comprises the step of: storing a record of the combination of unique identifiers for the selected audio blocks of the audio file generated in the storage device.

Preferably, each audio block comprises audio content from a single musical instrument.

In another embodiment of the invention, the method comprises the step of: selecting audio blocks with the same audio parameters for use in generating the audio output file, each audio block having audio parameters according to the audio track from which the audio block is separated. In this way, the audio blocks which are combined and used to create an audio file have the same tempo and harmonic map, which ensures the harmonic integrity of the audio file generated.

In another embodiment of the invention, the method comprises the step of: storing the audio blocks in a storage device according to one of: the audio parameters of the audio block and musical instrument.

In this arrangement, audio blocks separated from audio tracks having the same audio parameters, and therefore have the same music genre template map, and which correspond to the same musical instrument, will be stored together, such as in a folder, of the storage device. Audio blocks separated from audio tracks having the same audio parameters, but which correspond to different musical instruments, will be stored separately in the storage device. Audio blocks separated from audio tracks having different audio parameters, and which correspond to different musical instruments, will also be stored in separately in the storage device.

In another embodiment of the invention, the method comprises the step of: selecting audio blocks for the audio output file according to user preference data including one or more of: music genre, music style and mood data.

Such music genre, music style and mood data defines user preference data which is provided as input by a user to user interface means via a menu, such as a drop down menu, an icon based menu or any other suitable means which provides users with the capability to view and select from a plurality of options regarding music genre, style and/or mood data or other user preference as required or as desired.

In another embodiment of the invention, the method comprises the step of: operating a hold module to retain one or more audio blocks selected by the audio block selection means and to interchange at least one of the audio blocks selected by the audio block selection means with a previously unselected audio block according to user preference data.

In another embodiment of the invention, the method comprises the step of: operating a shuffle module to automatically remove from the audio output file generated one or more audio blocks selected by the audio block selection means and to incorporate into the audio output file an audio block or audio blocks from the storage device having the same audio parameters as the removed audio block or audio blocks.

In another embodiment of the invention, the method comprises the step of: operating an audio editing and mixing module to modify, refine, adjust, vary and/or change audio characteristics of the audio output file generated.

In another embodiment of the invention, the method comprises the step of: operating an audio editing and mixing module to modify, refine, adjust, vary and/or change audio characteristics of an audio block in the audio output file generated.

In another embodiment of the invention, the method comprises the step of: operating an audio editing and mixing module to adjust the tempo and/or shift the harmonic map of an audio track.

Such audio file editing means and mixing means provides a user with full creative control over mix and other parameters to modify as desired the audio output file generated and audio blocks used to form the audio output file.

In another embodiment of the invention, the method comprises the step of: importing other instrument performances and/or voice from an external source for incorporation into the audio output file.

In another embodiment of the invention, the method comprises the step of: operating an audio synchronisation module to synchronise the audio output file with a video file, a still image file, and/or a text file.

In another embodiment of the invention, the method comprises the step of: storing each audio output file generated in a storage device for retrieval as an audio track for the generation of additional audio output files.

In another embodiment of the invention, the method comprises the step of: linking a plurality of storage devices to provide an extended storage library of audio tracks and audio output files for creating audio blocks.

In another embodiment of the invention, the method comprises transmitting the audio output file generated to a computing device according to steps of:

separating the audio blocks of the audio output file into audio block segments, each audio block segment having a time slot such that audio block segments from the same audio block have a different time slot;

transmitting audio block segments having same time slot together such that audio block segments having the same time slot are received at the computing device at substantially the same time, and combining at the computing device audio block segments having the same time slot to form at least a portion of the audio output file, and combining the audio file portions to form the audio output file at the computing device.

According to the invention, there is provided a computer implemented system for generating an audio output file, the system including one or more processors and memory including program instructions executable by the one or more processors to provide:

means for receiving audio tracks, each audio track created according to audio parameters;

means for separating each audio track into at least one selectable audio block, each audio block including audio content from a musical instrument involved in creating the audio track;

means for assigning a unique identifier to each audio block;

means for selecting audio blocks for the audio output file, means for using the unique identifiers to select audio blocks, and means for generating the audio output by combining the selected audio blocks.

Preferably, the means for using the unique identifiers to select audio blocks is configured for selecting a combination of audio blocks such that the unique identifiers for the combination of audio blocks is not located in a record of a storage device indicating that the combination is allowable.

Preferably, the means for using the unique identifiers to select audio blocks is configured to compare unique identifiers of a selection of audio blocks with records in a storage device, such that if a record of a combination of the unique identifiers is located then an audio output file is not generated, and if a record of the combination of unique identifiers is not located then the selected audio blocks are combined to generate an audio output file.

In another embodiment of the invention, the system comprises means for recording the combination of unique identifiers for audio blocks of the audio file generated in a storage device.

Preferably, each audio block comprises audio content from a single musical instrument.

Preferably, audio blocks with the same audio parameters are selected for use in generating the audio output file, each audio block having audio parameters according to the audio track from which the audio block is separated.

Preferably, the audio blocks are stored in a storage device according to one of: the audio parameters of the audio block and musical instrument.

Preferably, audio blocks for the audio output file are selected according to user preference data including one or more of: music genre, music style and mood data.

In another embodiment of the invention, the system comprises a hold module to retain one or more audio blocks selected by the audio block selection means and to interchange at least one of the audio blocks selected by the audio block selection means with a previously unselected audio block according to user preference data.

In another embodiment of the invention, the system comprises a shuffle module to automatically remove from the audio output file generated one or more audio blocks selected by the audio block selection means and to incorporate into the audio output file an audio block or audio blocks from the storage device having the same audio parameters as the removed audio block or audio blocks.

In another embodiment of the invention, the system comprises an audio and mixing editing module operable to modify, refine, adjust, vary and/or change audio characteristics of the audio output file generated.

Preferably, the audio editing and mixing module is operable to modify, refine, adjust, vary and/or change audio characteristics of an audio block in an audio output file generated.

Preferably, the audio editing and mixing module is operable to adjust the tempo and/or shift the harmonic map of an audio track.

Such an audio output file editing and module enables a user to have full creative control over mix and other parameters to modify as desired the audio output file generated.

In another embodiment of the invention, the system comprises means for importing instrument performances and/or voice from an external source for incorporation into the audio output file.

In another embodiment of the invention, the system comprises an audio synchronisation module to synchronise the audio output file with a video file, a still image file, and/or a text file.

In another embodiment of the invention, the system comprises means for storing each audio output file generated in a storage device for retrieval as an audio track for the generation of additional audio output files.

In another embodiment of the invention, the system comprises means for linking a plurality of storage devices to provide an extended storage library of audio tracks and audio output files for creating audio blocks.

In another embodiment of the invention, the system comprises:

means for separating the audio blocks of the audio output file into audio block segments, each audio block segment having a time slot such that audio block segments from the same audio block each have a different time slot;

means for transmitting audio block segments having same time slot together such that audio block segments having the same time slot are received at a computing device at substantially the same time, means for combining at the computing device audio block segments having the same time slot to form at least a portion of the audio output file, and means for combining the audio file portions to form the audio output file at the computing device.

In a still further embodiment of the invention, there is provided a non-transitory machine-readable medium including instructions that, when executed by one or more processors, cause the one or processors to perform the steps according to a method as described.

In yet another embodiment of the invention, there is provided a computing device and/or arrangement of computing devices having one or processors, memory and display means operable to display an interactive user interface having the features as described.

In another embodiment of the invention, there is provided a system for generating an audio output file substantially as herein described with reference to and as shown in the accompanying drawings and/or examples.

In another embodiment of the invention, there is provided a method for generating an audio output file substantially as herein described with reference to and as shown in the accompanying drawings and/or examples.

The invention will be more clearly understood from the following description of some embodiments thereof, given by way of example only, with reference to the accompanying drawings, in which:

FIGS. 7 to 11 are schematics showing the steps performed in selecting audio blocks for generating audio files according to the invention;

Figure 1:
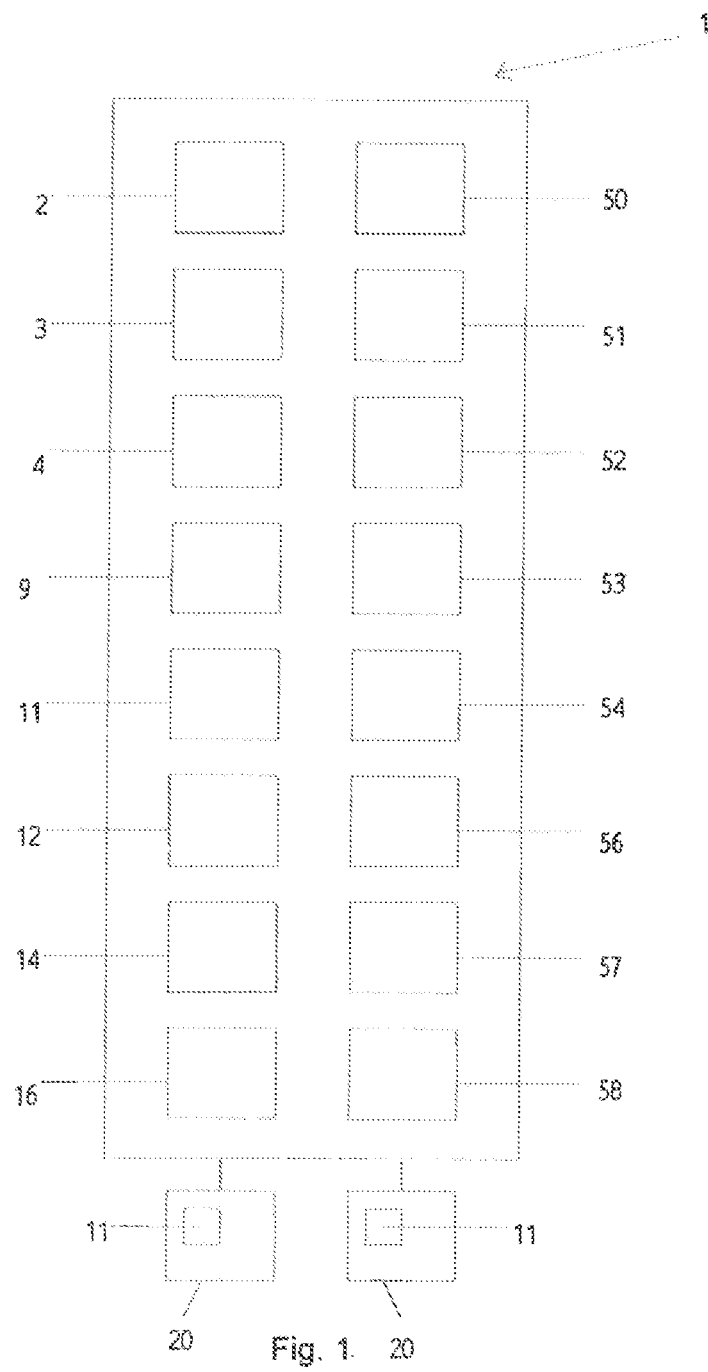
FIG. 1 is a block diagram showing of a system for generating an audio output file according to the invention.

Referring to the drawings, and initially to FIG. 1, there is shown a system, indicated generally by the reference numeral 1, for generating an audio output file, which is understood to be a file containing sequenced audio data which produces an audio output when processed by audio player means. The audio file may be in an audio file format, including, but not limited to, audio WAV format, MP3 format, advanced audio coding (AAC) format, Ogg format or in any other format, analog, digital or otherwise, as required. The desired audio format may optionally be specified by a user. The system 1 is implemented by one or more computer processors 2 and memory 3 including computer software program instructions executable by the one or more processors 2. The computer processors 2 may be provided by a computer server or network of connected and/or distributed computers.

The program instructions executable by the one or more processors provide means 4 for receiving audio tracks, in which each audio track is created according to audio parameters, such as tempo, genre and harmonic map. The audio parameters for the audio tracks define a music genre template map which may be distributed to individual human music composers who may author musical or other sound works based on the music genre template map, which form audio tracks for the system 1. Such audio tracks may be pre-recorded audio tracks, or be dynamically imported from an external source.

Also shown in FIG. 1 are means 16 for separating each audio track into at least one selectable audio block, each audio block including audio content from at least one musical instrument involved in creating the audio track, the means 16 further operable for assigning a unique identifier to each audio block, and means 12 for selecting audio blocks for the audio output file based on user preference data, such as music genre, style and/or mood data, received via the user interface means 11 of the system 1. User interface means 11 may be provided on user computing devices 20 executing application software enabling a user to create audio output files according to the present invention, such user computing devices 20 coupled via a network to the system 1.

The system 1 further comprises means 14 for comparing the unique identifiers of the selected audio blocks with records in a storage device 9, and means 3 for generating an audio output file by combining the selected audio blocks if a record of the combination of unique identifiers is not located in the storage device 9. Also provided are means 50 for recording the combination of unique identifiers for audio blocks of the audio output file generated in the storage device 9.

Also shown in FIG. 1 is a holding module 51 which is operable to retain one or more audio blocks selected by the audio block selection means and to interchange at least one of the audio blocks selected by the audio block selection means 12 with a previously unselected audio block according to user preference data. A shuffle module 52 is also provided to automatically remove from the audio output file generated one or more audio blocks selected by the audio block selection means 12 and to incorporate into the audio output file an audio block or audio blocks from the storage device 9 having the same audio parameters as the removed audio block or audio blocks.

The system 1 further comprises an audio mixing and editing module 53 which is operable to modify, refine, adjust, vary and/or change audio characteristics of the audio output file generated, the audio characteristics of a specific audio block in an audio output file, and also an audio track by adjusting the tempo and/or shifting the harmonic map of the audio track. Also shown, are means 54 for importing instrument performances and/or voice from an external source for incorporation into the audio output file.

An audio synchronisation module 55 is operable to synchronise the audio output file generated with a video file, a still image file, and/or a text file. Such synchronisation means 15 is further operable to enable users to mark events in a film or video clip with the use of a time line and to then deliver musical stingers relative to the key of the audio file generated.

For example, a user may prepare one or more audio files for use as musical stinger or swell and tag the audio file by a musical key, such as 'A' minor or any other key as desired. Then, when a film event needs audio content, for example, eighteen seconds into the film, a marker is created on the eighteen second point of the time line. The synchronisation means is then operable to analyze the harmonic map audio content of the film at eighteen seconds. Thus, for example, if the synchronization means detects that the audio content for the film is passing through the 'A' minor key at this point of the time line it retrieves from the library of audio files generated a stinger hit or swell relevant to the key of 'A' minor and places the stinger audio file at the eighteen seconds point of the time line. The audio file may be dragged along the film time line manually as required to make adjustments to its placement if necessary.

The storage means further comprises or is in the form of an audio storage library operable to store for retrieval the generated audio files as pre-recorded audio tracks. Audio editing means is operable to enable stored pre-recorded audio track to be edited by tempo adjustment and/or harmonic map shifting. The audio separating means is further operable for separating retrieved pre-recorded audio tracks into audio blocks which are made available for use in generating further audio files.

Such an arrangement provides back catalogs of audio files in the form of an interactive music content library. This is made possible by composers applying a musical template to existing musical tracks provided by previously generated audio files and adapting key influences to each part, stem, or instrument performance of that audio file. The key influences include adjusting of the tempo of the music and the moving of the harmonic mapping of the said audio file to the harmonic map dictated by the templates provided. Furthermore, linking music libraries enables content to be interactively adapted so that multiple new audio blocks may be generated by joining and pooling the interactive content of those libraries to create one mass universal pool of shared content.

Each audio output file generated is stored in the storage device 9 for retrieval as an audio track for the generation of additional audio output files. A plurality of storage devices 9 may be linked to provide an extended storage library of audio tracks and audio output files for creating audio blocks.

Once an audio output file has been generated, and/or a combined audio image multimedia file resulting from synchronisation of the audio output file with a video file, a still image file, and/or a text file, it is then able to be transmitted or downloaded to a user computing device 20 for subsequent editing and/or use. Such an audio output file and/or combined audio image multimedia file may be transmitted as a single complete file.

In an alternative transmission process an audio output file may be transmitted as file portions. To enable such a transmission process there is provided means 56 for separating the audio blocks of the audio output file into audio block segments, each audio block segment having a time slot such that audio block segments from the same audio block each have a different time slot, means 57 for transmitting audio block segments having same time slot together such that audio block segments having the same time slot are received at a computing device 20 at substantially the same time, and means 58 for combining at the computing device 20 audio block segments having the same time slot to form at least a portion of the audio output file and then combining the audio file portions to form the audio output file at the computing device 20.

FIGS. 2 to 11 show the steps in a computer implemented method for generating an audio output file according to the invention. It will be understood that FIGS. 2 to 11 are provided by way of example only to demonstrate the steps performed according to the present invention, and reference to the specific example in FIGS. 2 to 11 should therefore in no way be seen as limiting on the invention.

Figure 2:
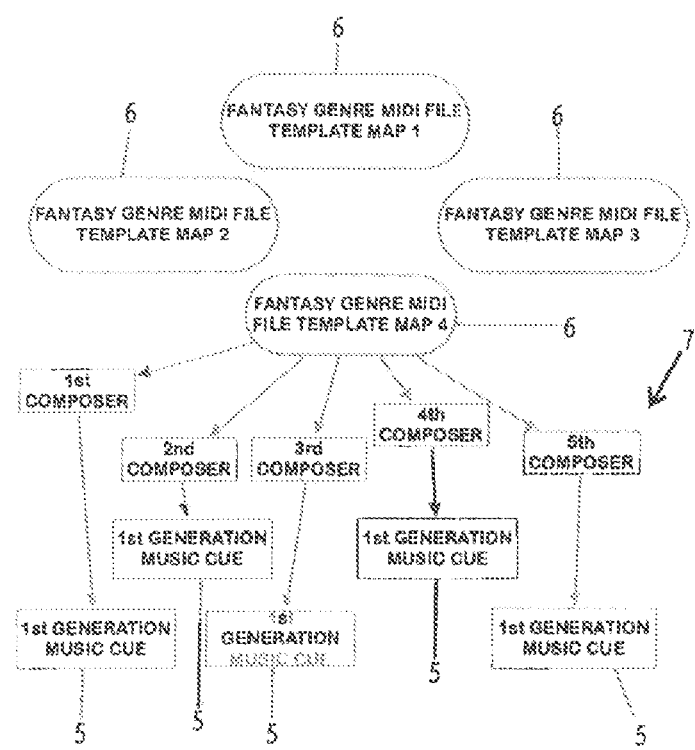
FIG. 2 is a flow diagram showing the initial steps involved in creating audio blocks for use in a method for generating an audio file according to the invention.

Shown in FIG. 2 are four music genre template maps 6, each corresponding to the music genre fantasy. These four music genre template maps 6 are sent to human composers or musicians who obey the audio parameters laid out by the template map and compose one or more unique musical or sound compositions, which may be single or multiple instrument performances, to thereby create pre-recorded audio tracks 5 sent to and received by receiving means of the system 1. An audio track 5 is thus an audio content file, which may be a music or sound file in an appropriate format.

In the example shown, the music genre template map 6, identified as FANTASY GENRE MIDI FILE TEMPLATE MAP 4, has been sent to five composers 7. Each composer has produced a pre-recorded audio track 5, referred to as a $1^{st}$ GENERATION MUSIC CUE, according to the audio parameters, which include, but are not limited to, tempo, genre and harmonic map, in the music genre template map 6. The various other music genre template maps 6, that is FANTASY GENRE MIDI FILE TEMPLATE MAPs 1 to 3, are also sent to the same or other composers or musicians for the composition of further audio tracks.

Figure 3:
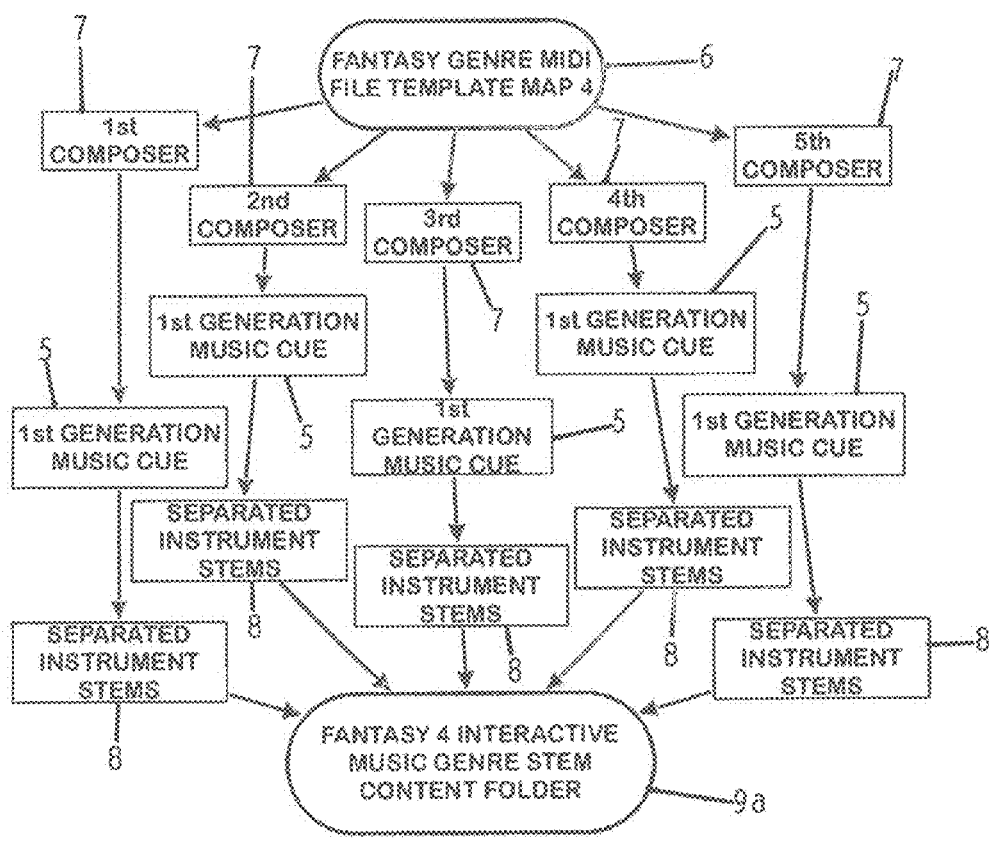
FIG. 3 is a flow diagram showing the further steps involved in creating audio blocks according to the invention.

As shown in FIG. 3, each audio track 5 is separated into one or more audio blocks 8, each audio block corresponding to a musical instrument involved in creating the pre-recorded audio track 5.

Figure 4:
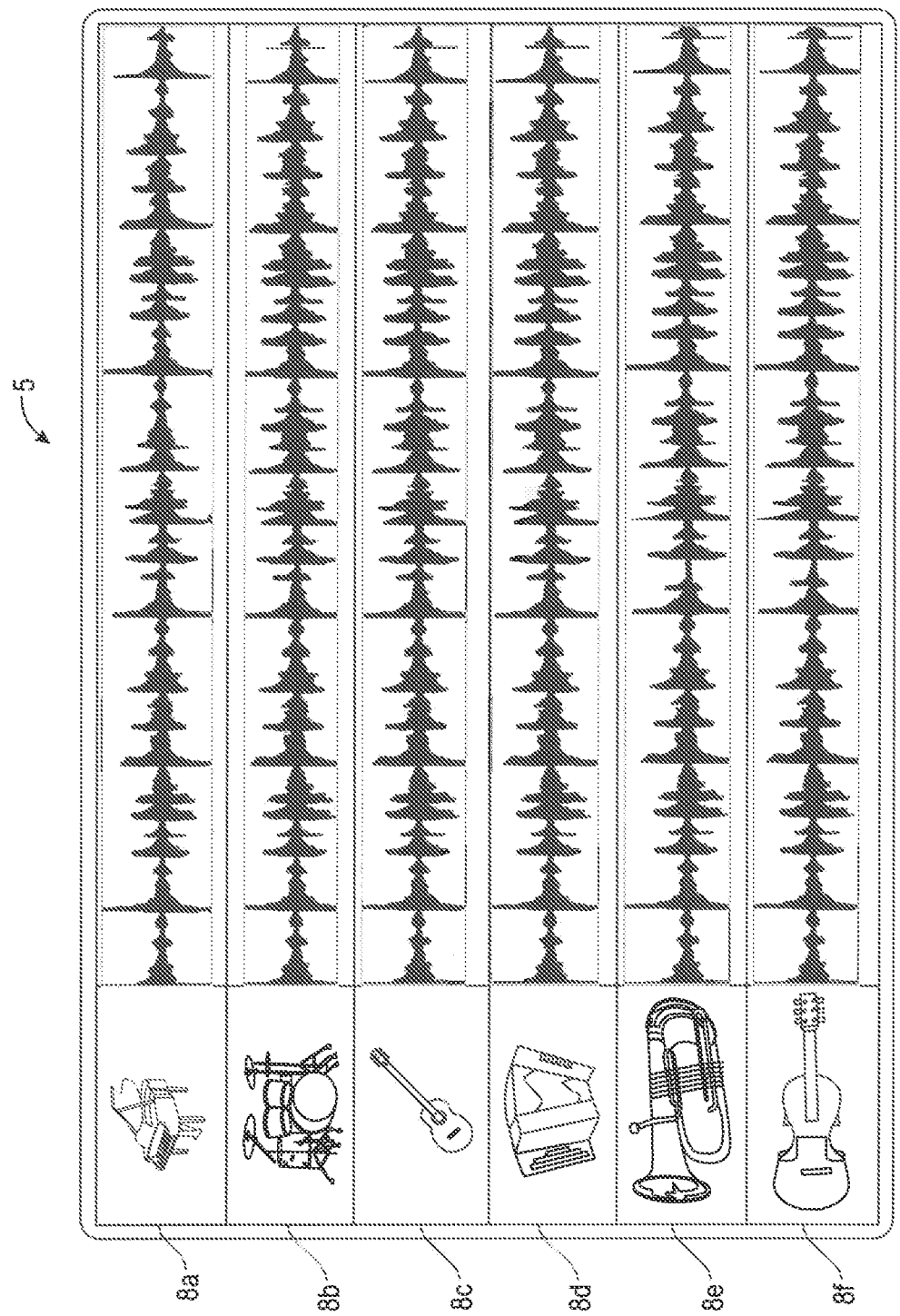
FIG. 4 is a stylised illustration showing a pre-recorded audio track separated by musical instrument according to the invention.

FIG. 4 shows a pre-recorded audio track 5 separated by musical instrument performance. In the instance shown, audio track 5 is separated into six audio blocks 8a to 8f, the audio block 8a being the piano part of the audio track 5, audio block 8b the drums part of the audio track 5, 8c the guitar part of the audio track 5, 8d the accordion part of the audio track 5, 8e the trumpet part of the audio track 5 and 8f the violin part of the audio track 5. The combination of individual audio blocks 8 therefore make up an audio track 5 for the system 1, and no two audio tracks 5 will have the same audio blocks 8 as they will have been uniquely composed and recorded for transmission to the system 1 in an audio file format by different composers or musicians.

Figure 5:
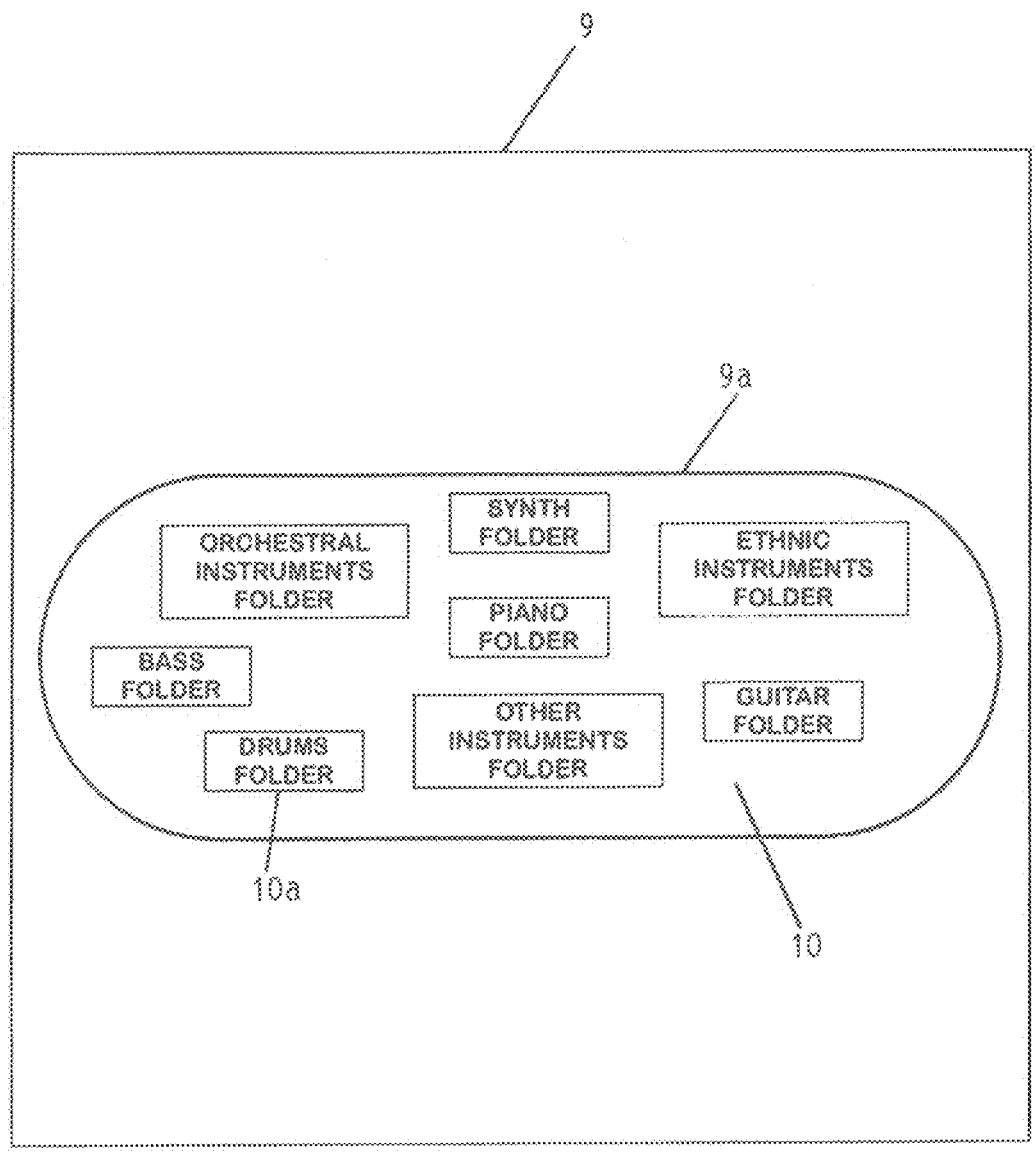
FIG. 5 is a block schematic showing an exemplary file arrangement in storage means for the audio blocks according to the invention.

The audio blocks 8 are stored in a storage means 9 of the system 1. The storage means 9 may be a local storage device, or a remote storage device, such as "cloud" based storage memory and access system. FIG. 5 is an exemplary file arrangement in storage means 9 for the audio blocks 8, which in the instance shown, are stored according to the audio parameters and by musical instrument corresponding to the audio block 8. FIG. 5 shows a file arrangement in the form of folder 9a of the storage means 9 containing all the audio blocks 8 corresponding to a single template map. In single template map folder 9a the audio blocks 8 are further categorised by specific instrument. For example, folder 9a contains all audio blocks 8 for a specific music genre template map 6, such as FANTASY GENRE MIDI FILE TEMPLATE MAP 4, and within folder 9a is a folder 10a of all drum parts from all pre-recorded audio tracks 5 which belong to FANTASY GENRE MIDI FILE TEMPLATE MAP 4. The audio blocks 8 in the folder 9a will thus be interchangeable and compatible without limitation since they are derived from the same template map and thus have the same audio parameters. As audio blocks 8 may be added to folder 9a by receiving a further pre-recorded audio track 5 from a composer or musician based on the FANTASY GENRE MIDI FILE TEMPLATE MAP 4, there is no limit to the number of audio blocks 8 which may be stored in the folder 9a.

The system 1 further comprises audio block tagging means 14 for assigning to each audio block 8 a unique identifier. For example, an audio block 8 derived from folder 9a and in the drums folder 10a may be assigned a unique identifier based on combinations of tags according to a template map identifier, the unique identifier based on the instrument part for the audio block, an identifier based on a number for the pre-recorded audio track, and an identifier for the composer or musician. Thus, for example, an audio block 8 in the drums folder 10a of FIG. 5 may be assigned a unique identifier: FT4-D431-JS, which identifies the template map FANTASY GENRE MIDI FILE TEMPLATE MAP 4, as "FT4", the instrument part drums, as "D", the pre-recorded audio track received as track number "431", and the composer as John Smith "JS". Further examples of unique identifiers are also shown in FIG. 11, although it will be understood that any suitable tags may be used to uniquely identify each audio block 8 stored.

The system 1 further comprises an interactive user interface means 11 enabling users to interact with the system 1 via a computing device 20 to generate an audio output file.

Figure 6:
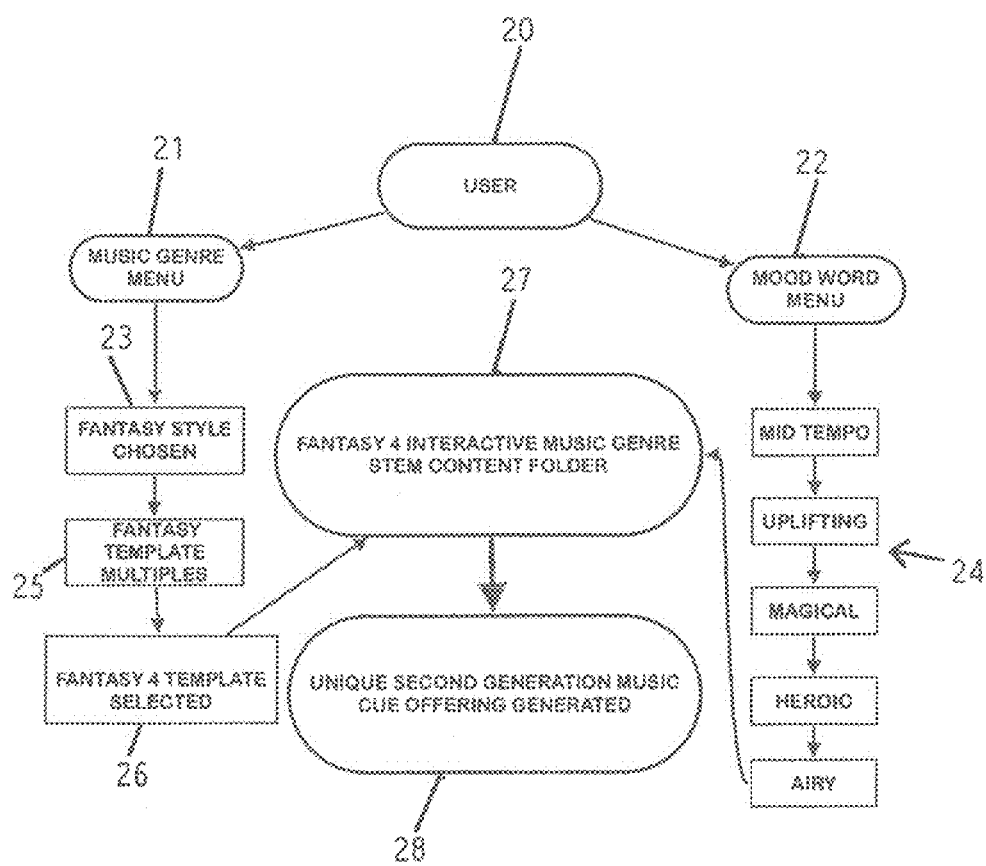
FIG. 6 is a flow diagram showing the steps performed in a method for generating an audio file from audio blocks according to the invention.
Figure 7:
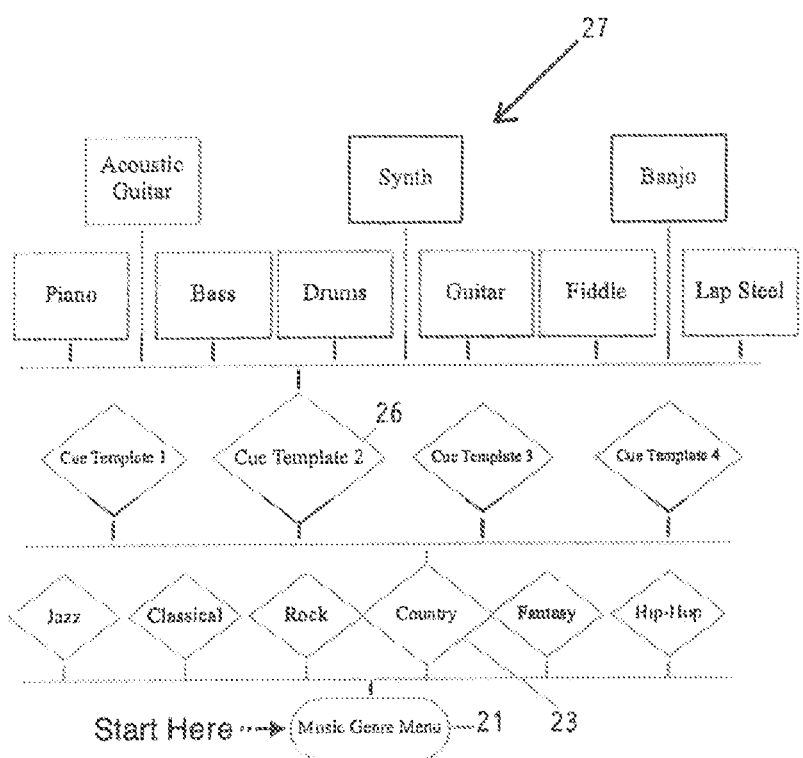

As shown in FIGS. 6 and 7 initially, a user inputs user preference data to the user interface means 11 via menus 21, 22, which provides users with the capability to view and select from a plurality of options, such as music genre, style and/or mood data and/or other user preference as required or as desired.

As shown in FIG. 6, and by way of example, the user 20 has selected, at step 23, the music genre "fantasy", and at step 24, the mood words "mid tempo", "uplifting", "magical", "heroic" and "airy". Based on the user input an audio block selection means 12 (shown in FIG. 1) is operable, at step 25, to parse all templates for the selected genre, and select, at step 26, the most suitable genre for the user based on further refinement according to the mood word input, which in the instance shown is the FANTASY 4 TEMPLATE.

At step 27, a selection of audio blocks 8 from the folder 9a in the storage means 9 corresponding to the FANTASY 4 TEMPLATE is made by the audio block selection means 12, the selection being made according to the user preference data, such as music genre, style and/or mood data, received via the user interface means of the system 1. By selecting audio blocks 8 from the same folder 9a the audio block selection means selects audio blocks 5 with the same audio parameters for generating the audio file at step 28. In this way, the audio blocks 8 which are combined and used to create an audio file have the same tempo and harmonic map, which ensures the harmonic integrity of the audio file generated.

The unique identifiers of the selected audio blocks 8 are compared with records in a storage device of unique identifiers for previously generated audio output files, such that if a record of a combination of the unique identifiers is located then an audio output file is not generated, and if a record of the combination of unique identifiers is not located then the selected audio blocks are combined to generate an audio output file. In this way the system 1 prevents the use of the same combination of audio blocks in the generation of audio output to ensure that the audio output files generated a sufficiently unique.

The operation of the audio block selection means 12 will be shown by way of example and with reference to FIGS. 7 to 11, which are schematics showing the steps performed by the system 1 for selecting a unique arrangement of audio blocks 8 for generating audio files according to the invention.

In the instance shown in FIG. 7, the user has selected the genre "Country" via the user interface and through refinement based on mood words a suitable country "Template 2" has been selected as being the best selection for the user. Shown in FIGS. 8 to 10 are the instrument folders 30 for "Template 2" and in each folder are audio blocks 8, each audio block 8 being referred to as a stem.

Figure 8:
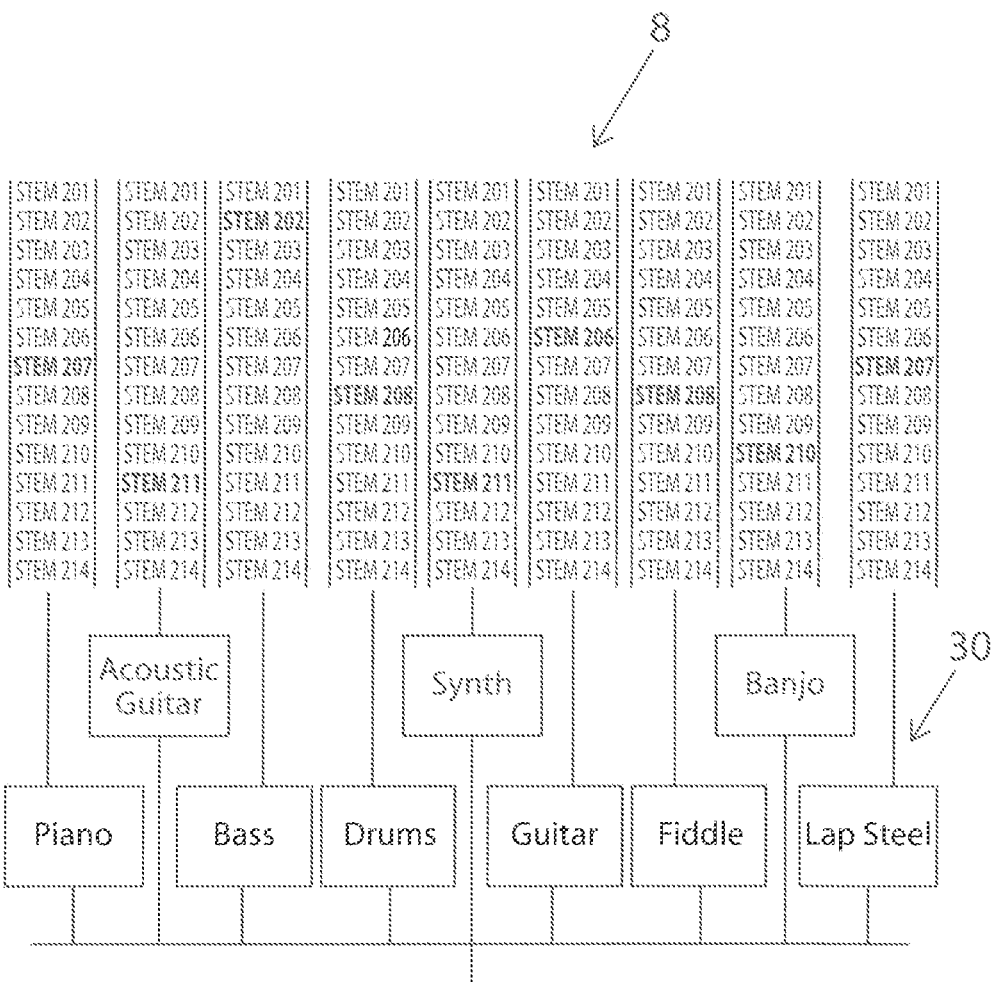

As shown in FIG. 8, the audio block selection means 12 has selected audio block "Stem 207" from the "Piano folder", and this selection is shown in FIG. 11 in the column indicated by the reference numeral 40 as having the unique identifier "CT2-P207-DW". The audio block selection means 12 has also selected "Stem 211" from the "Acoustic Guitar" folder, and this selection is shown in FIG. 11 at column 40 as having the unique identifier "CT2-AG211-BK", and so on. The audio blocks 8 at column 40 are combined to generate an audio file, which in the present instance is shown at column 40 as being entitled "Crazy Horse".

Figure 9:
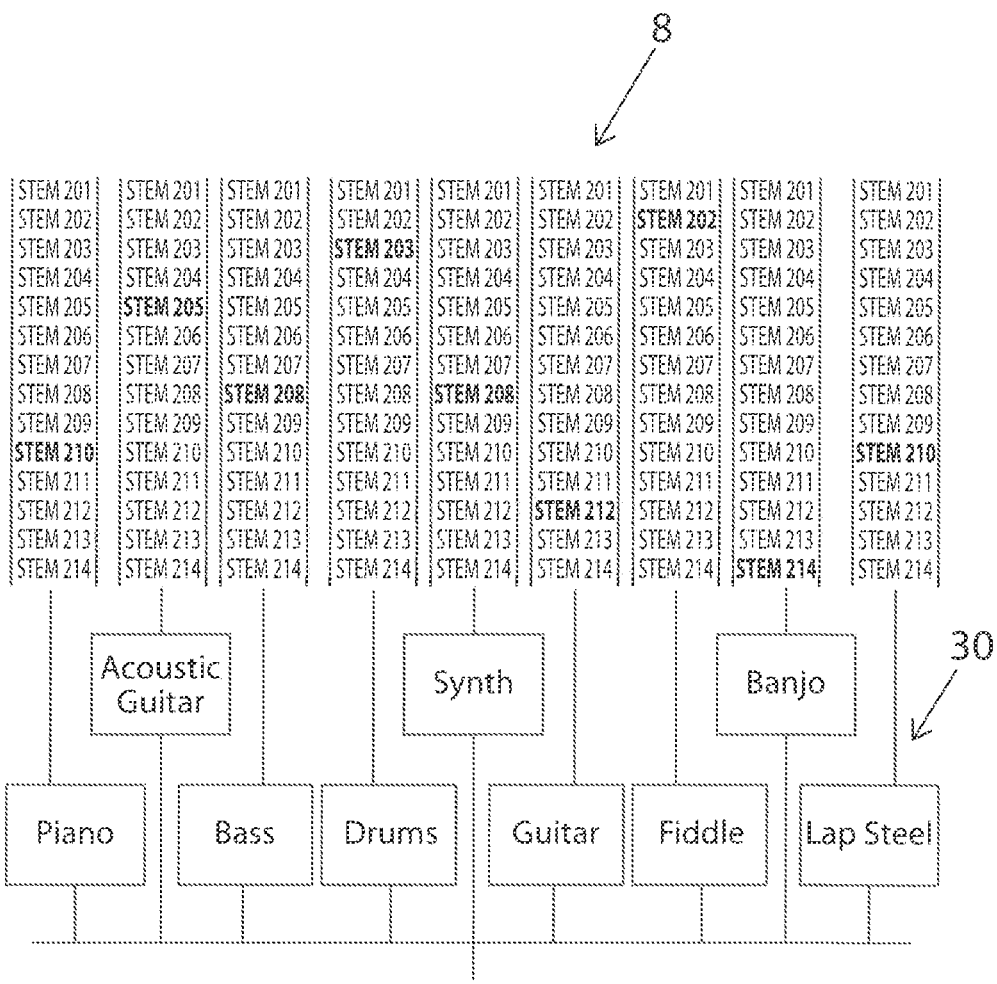
Figure 10:
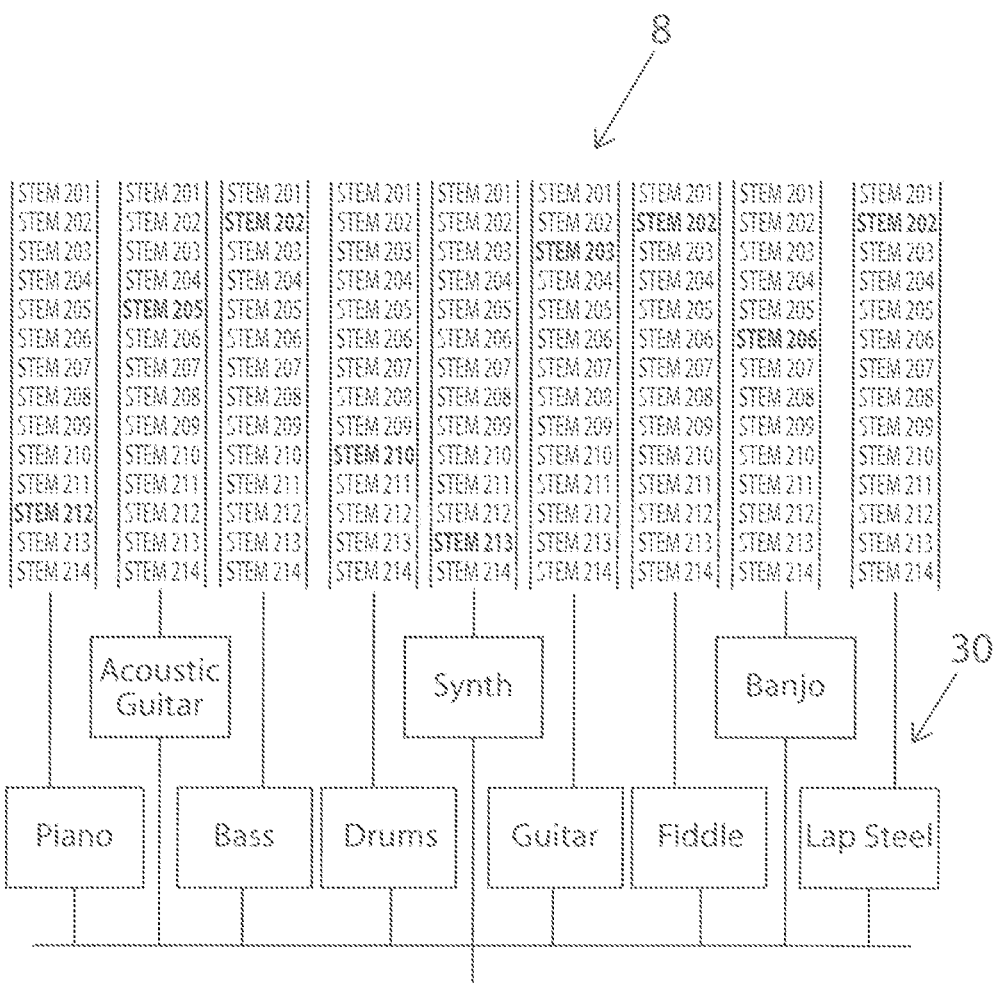

FIGS. 9 and 10 show selections of audio blocks 8, also from instrument folders 30 for the same "Template 2" for new audio files entitled "Rodeo Bill" at column 41, and "Yellow Texas" as column 42. Notable is that the audio blocks 8 selected for each new audio file 41, 42 comprise a unique combination of audio blocks 8, which is indicted by the original combination of unique identifiers in each of columns 40, 41, 42. It is further notable that the same audio blocks 8 may be used in different audio files, but the full combination of audio blocks for each audio file 40, 41, 42 is unique. For example, the audio block "CT2-B202-FJ" is used for both audio files 40, 42 although the full combination of audio blocks, as shown by the unique identifiers for each column is different. The same audio blocks 8 may thus be used in many different audio files, but it is the aggregation of the audio blocks 8 in an audio file that renders the audio file generated unique.

The audio block selection means 12 is also operable to interchange at least one selected audio block 8 with a previously unselected audio block 8 according to further user preference data received via the user interface means 11 of the system 1. The audio block selection means 12 comprises a hold function operable to enable a user to retain one or more audio blocks 8 selected by the audio block selection means 12. A shuffle function is also provided to enable a user to remove one or more audio blocks 8 selected by the audio block selection means 12, and select an alternative audio block 8 of the same audio parameters from the storage means 9. Thus if the user is unsatisfied with an audio file generated he or she simply asks for a regeneration. The system 1 shuffles the content within each instrument folder 10 within the associated single template map folder 9a and the audio block selection means 12 deals a new hand of audio blocks 8 forming another unique audio file. In addition the user may choose to hold certain performance audio blocks 8, such as piano or guitar and replace the remaining audio blocks 8 until a desired musical cue emerges from the collective single template map folder 9a.

Figure 12:
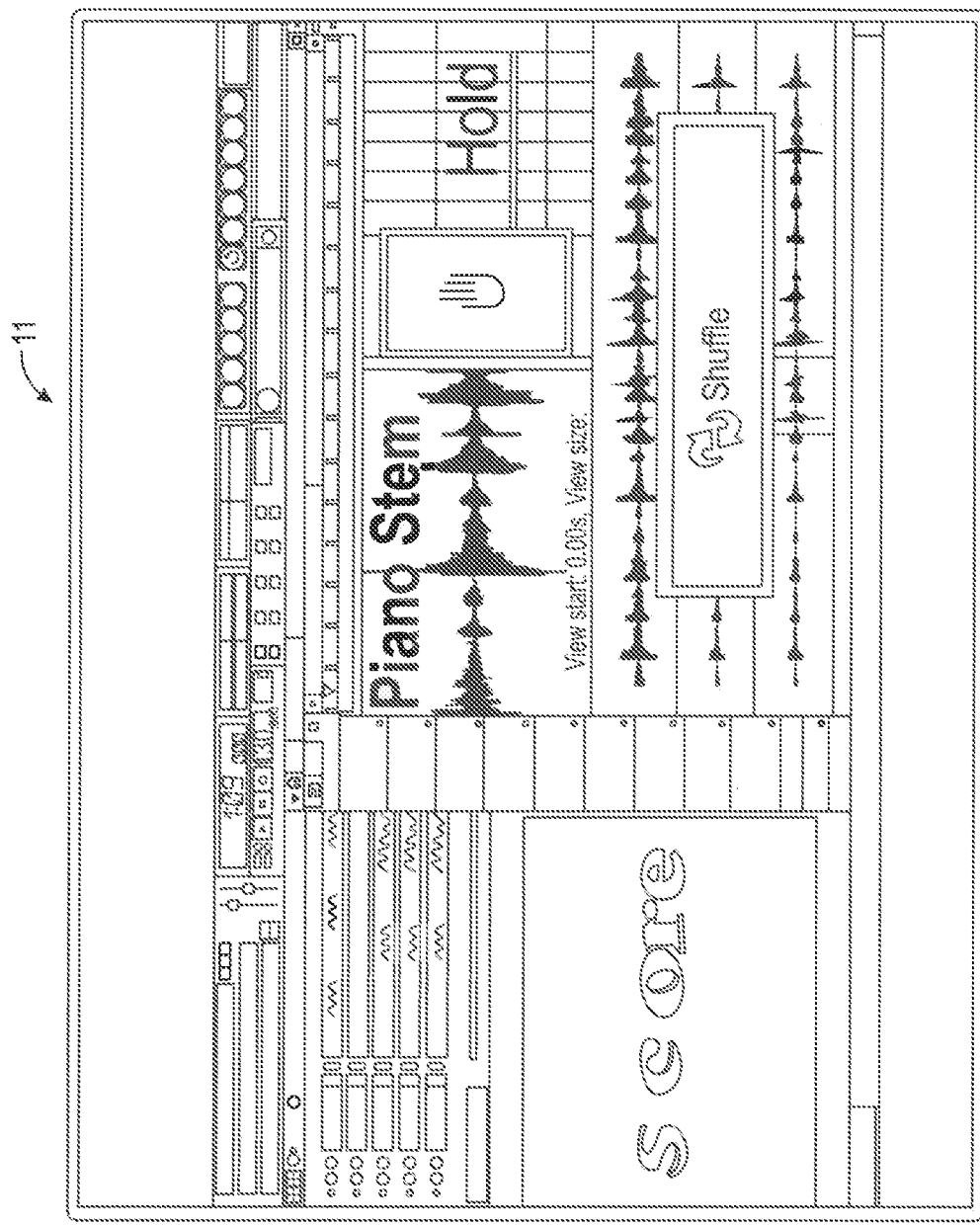
FIGS. 12 to 15 are screenshots of a user interface means according to the invention.

FIG. 12 is screenshot of a user interface means 11 which provides an interactive graphical display via which a user may operate a holding module 51 to hold certain audio blocks 8 while discarding other audio blocks 8 from the audio output file, and optionally exchange other audio blocks 8 through the use of a shuffle module 52 for alternative or more suitable audio block selections.

In providing alternative audio block selection options to a user the system 1 is operable to ensure that the combination of audio blocks 8 in a resulting audio output file is unique by ensuring that the combination of unique identifiers for the audio blocks is not in a record of the storage device 9.

The system 1 further provides audio file recording means, editing means and mixing means enabling a user full creative control over mix and other parameters to modify as desired the audio file generated by the audio file generation means. Users may also import other instrument performances and/or voice from an external source and incorporate them into the audio file using the audio file recording means, editing means and mixing means, which are operable by the user interface means 11.

The system 1 is further operable to enable an audio output file generated to be made available for downloading to a computing device.

Figure 20A:
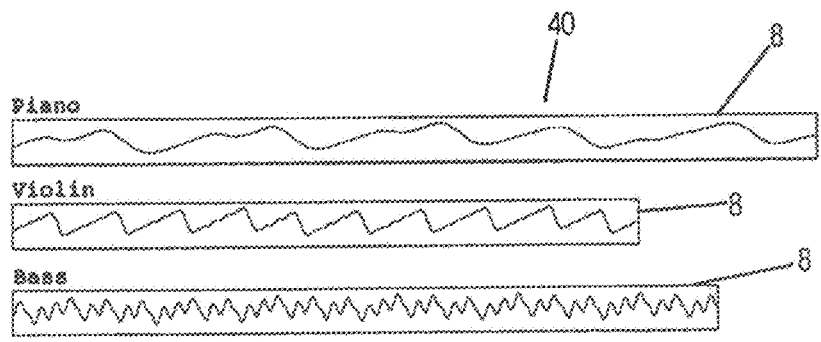
FIGS. 20a to 20c are block schematics showing steps in a method of downloading an audio file generated according to the invention.
Figure 20B:
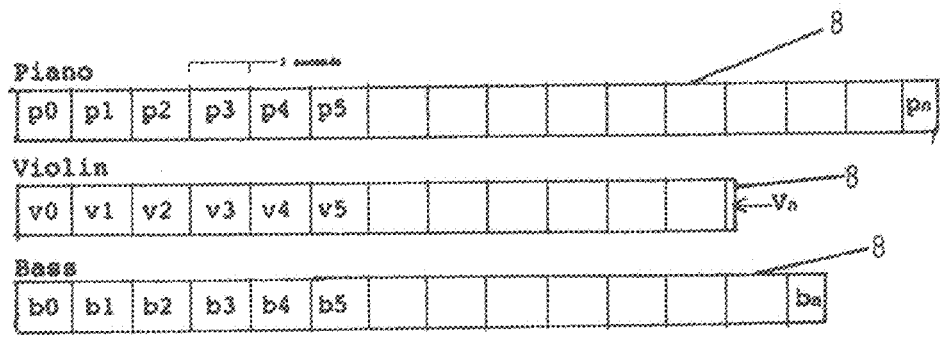
Figure 20C:
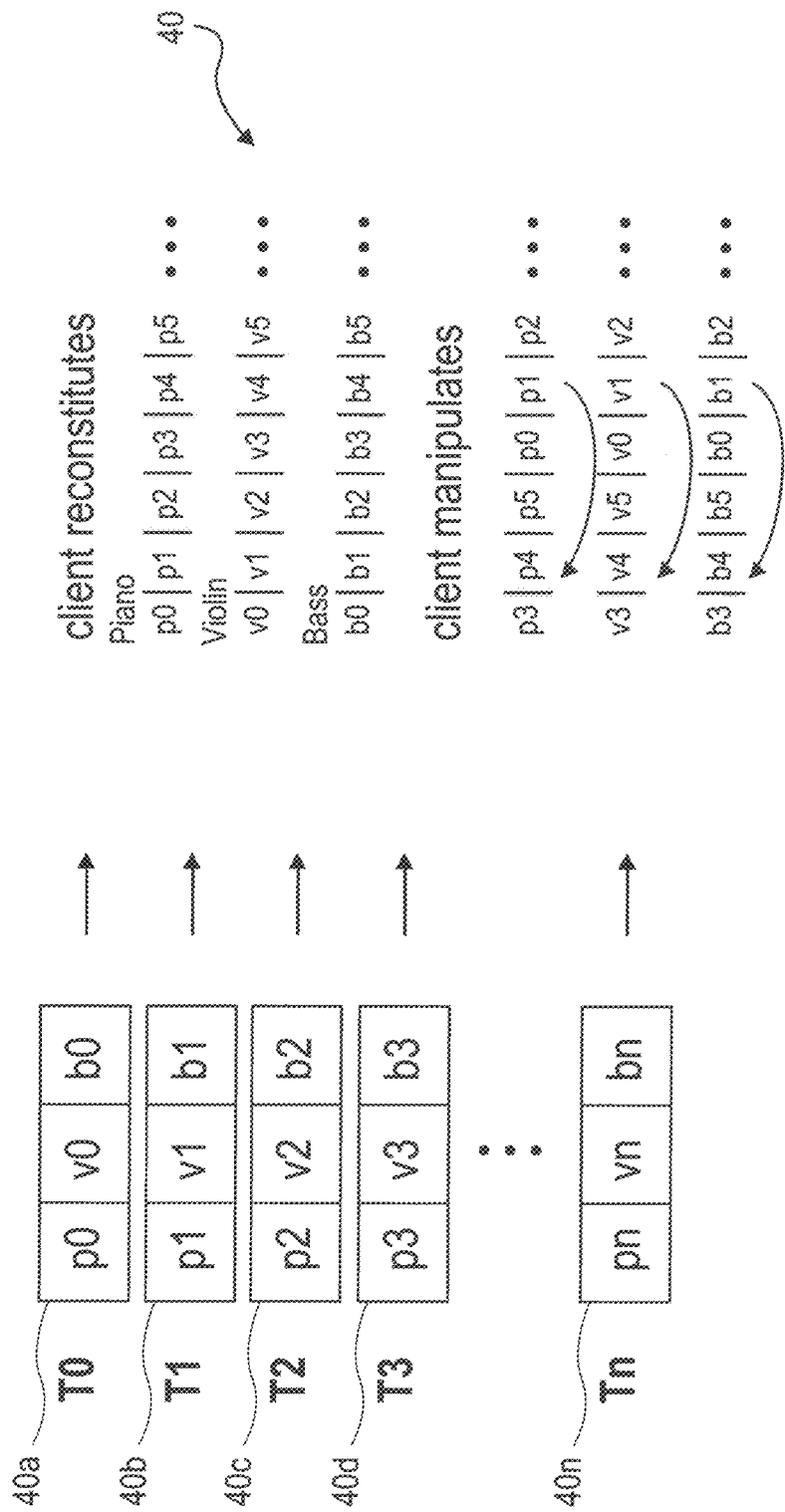

FIGS. 20a to 20c show an exemplary download process according to the invention, which comprises steps of: dividing the audio blocks 8 combined to form the audio file 40 into audio segments, shown as audio segments p0 to pn, v0 to vn, and b0 to bn. Each audio segment p0 to pn, v0 to vn, and b0 to bn is assigned a time slot, optionally according to the sequence location of the audio segment in the audio block 8. In the instance shown, each audio segment has a duration of two seconds, although it will be understood that the time slot duration for an audio segment may be configured as required.

Audio segments p0 to pn, v0 to vn, and b0 to bn are then transmitted such that audio segments from different audio blocks having the same time slot are received at a receiving computing device 20 at substantially the same time. Thus, as shown in FIG. 20c, and by way of example, audio segments p0, v0 and b0 will be transmitted at the same time, indicated as T0, and then at a subsequent time, indicated as T1, audio segments p1, v1 and b1 will then be transmitted together and so on.

At the receiving computing device 20 audio segments from the same time slot are then combined to form portions 40a to 40n of the audio file 40. The audio file portions 40a to 40n are then combined to reform the original audio file 40 at the computing device. Audio segments derived from the same time slot may also be shifted to a different time slot as desired.

The present invention thus also provides a protocol that interleaves audio segments specified by a common identifier provided as a time slot and enables them to be transmitted over a single data connection of undetermined bandwidth and latency such that they are received together at a client device for simultaneous interpretation or processing. Subsequent audio segments may be fetched over the same or other parallel data connections. The use of the time slot for each audio segment enables synchronicity for those audio segments.

The time slots for each audio block may be specified arbitrarily such that the sequence by which the audio segments are transmitted does not have to follow the sequence of audio segments in an audio block. Audio blocks may include a segment to act as marker for a specified time slot which allows for audio blocks to be of variable length. Other audio segments may be dynamically added or removed from an audio block. An audio segment may be marked as a terminal segment to indicate that it is the last audio segment in a transmission. This provides an option to terminate the download of an audio file.

Figure 13:
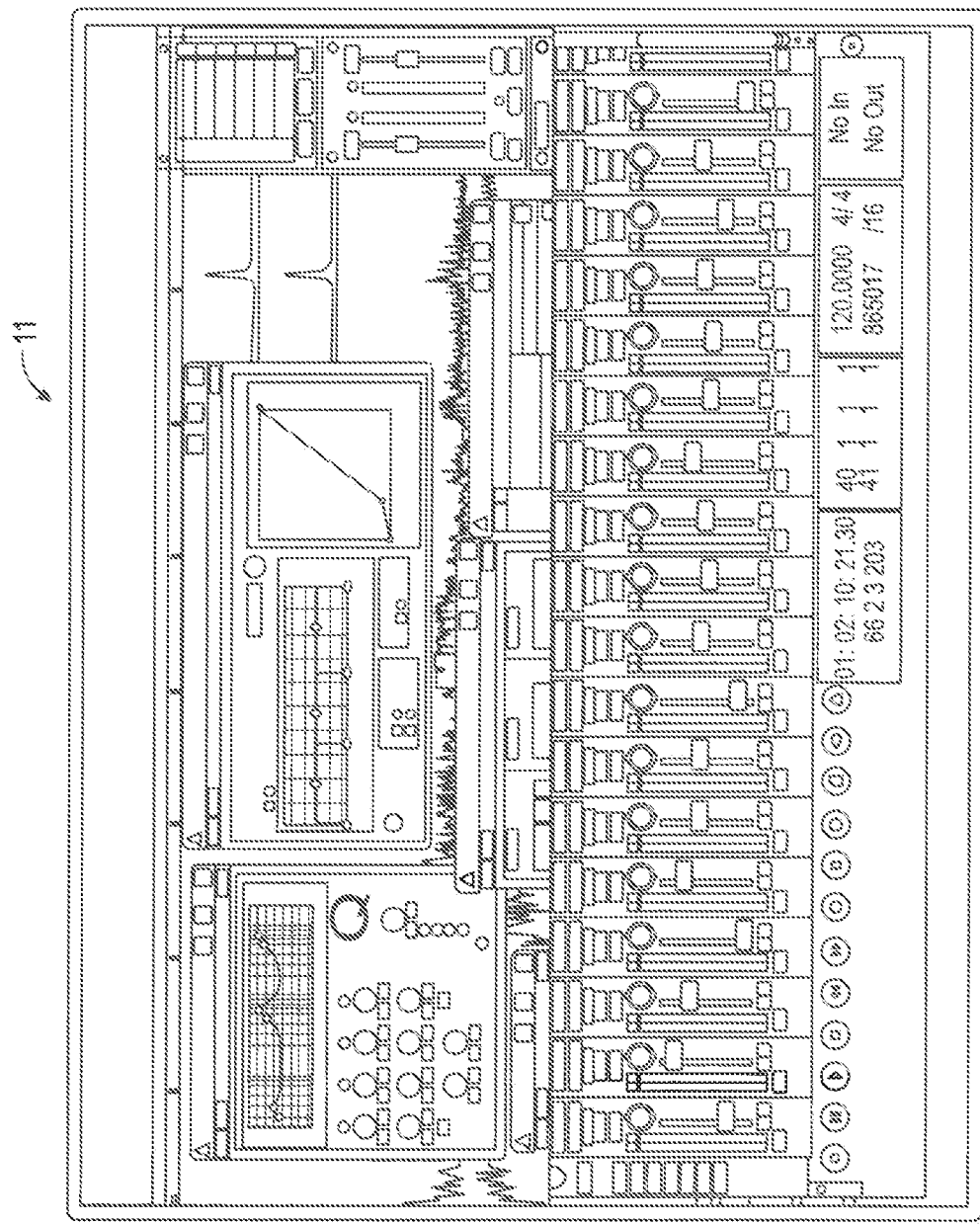

FIG. 13 shows a user interface means 11 which provides an interactive graphical display via which a user may set the mix levels of all instrument performances as required or as desired. In addition, a user may import other software tools to the system 1 so they may be run as third party plug-ins. Accordingly, unique edits using audio tools by third party manufacturers are able to be imported into the system interface.

The system 1 also provides audio mixing and editing functionality which allows new audio blocks 8 to be added after the editing of previous audio blocks 8 and entitles them to the same automatic editing. This ensures that all added audio blocks 8 will follow the harmonic integrity of the audio file generated. Also provided is a step back memory system, so that a user may return to an older arrangement if required. This is useful if a user decides he or she preferred an earlier audio file generated.

Figure 14:
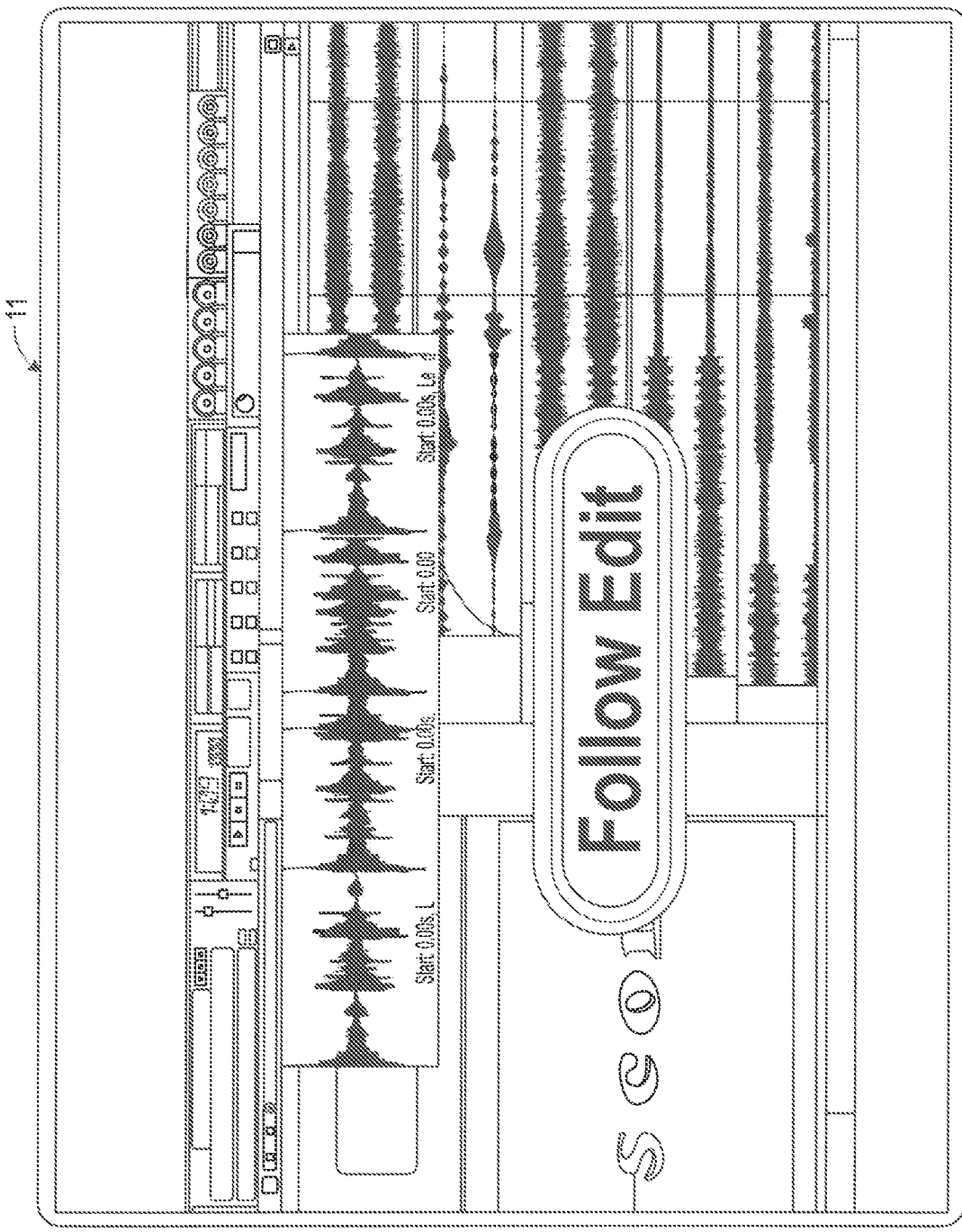

FIG. 14 shows a user interface means 11 implementing the above feature which is shown as a selectable "Follow Edit" user interface button. For example, if a user cuts the audio output file in three parts and moves the start portion to the original middle, and the end portion to the original start position and finally the middle portion to the original start position then the late introduction of a new unedited stem will not line up and the harmonic integrity will be lost. However if they now select follow edit the system will make all necessary past edit events and apply them to the new stem in order to correct the arrangement.

Figure 15:
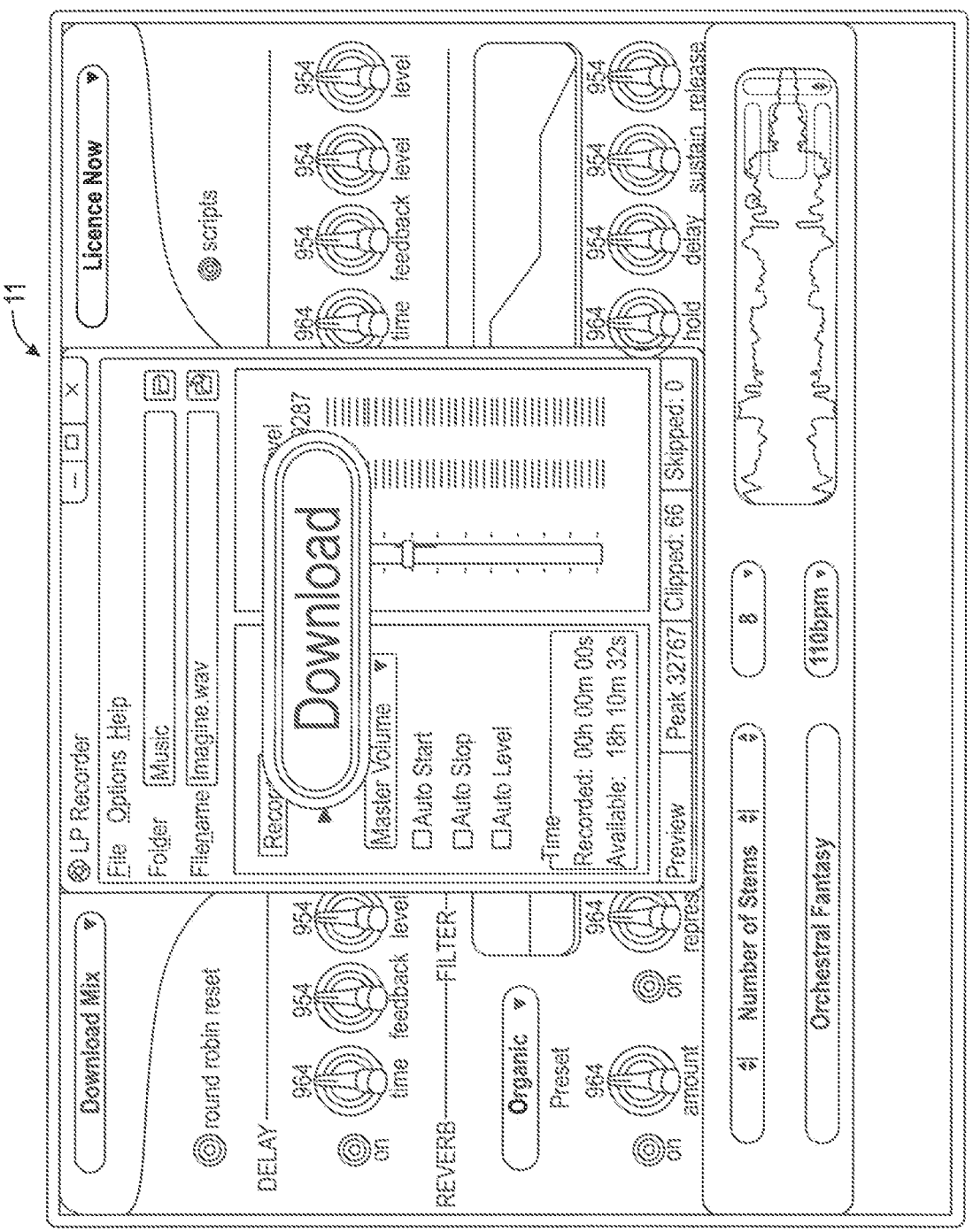

When user is fully satisfied with the audio output file generated they pay a license fee which grants a license under a publishing agreement with conditions. The final audio file is then downloaded to the users platform system in a format specified by the user. FIG. 15 shows a user interface means 11 implementing the download feature which is shown as a selectable "Download" user interface button. The new and unique audio file is available to be downloaded as a file by the user.

Figure 16:
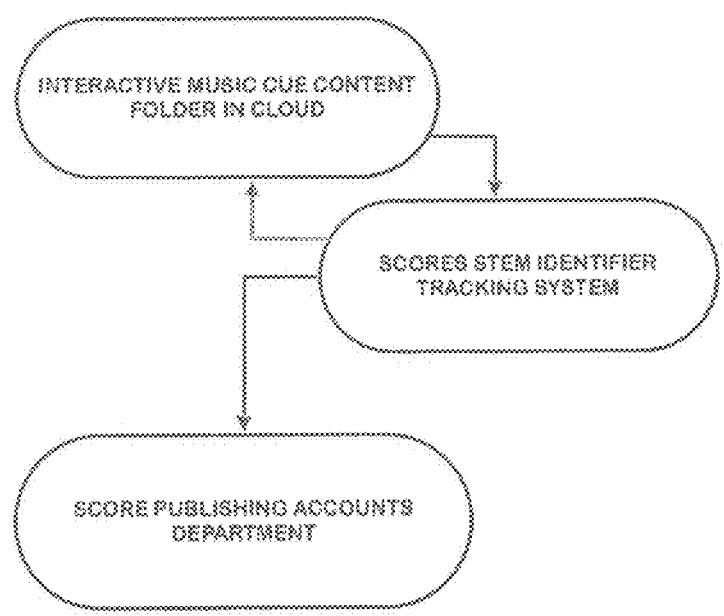
FIG. 16 is a block diagram showing the present invention integrated with a back-end accounting application.

FIG. 16 is a flow diagram showing the present invention integrated with a back-end accounting application. The systems back end accounting program will record all audio block combinations in a audio file composition and will, according to the approach described above, restrict the combination from ever been generated again and so will prevent the musical cue being repeated to another user and not create a replica musical cue. However it will allow for the generation of similar or related musical cues in order to give continuity to a certain user project such as a game or film. Each audio block carries an identification finger print which traces its origin right back to its original composer. The author of the musical work are deemed by the system to be composers of the respective performance audio blocks used in the unique musical cue composition and the user as he or she was also creatively involved in the composition process through arrangement of audio blocks. In addition the back end accounting program will keep an updated record of all audio block usage and a trace to the composer of origin identity so that correct and due license payment shares can be calculated and paid. In addition these calculations are made by the systems back end accounting program.

Figure 17:
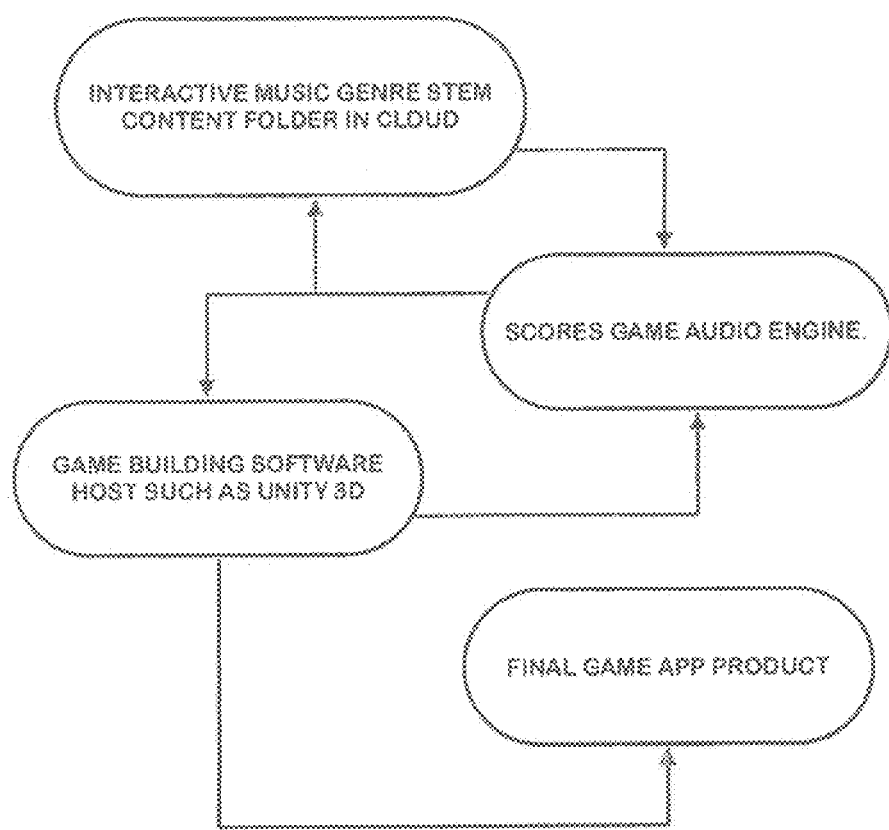
FIG. 17 is a block diagram showing the present invention integrated with a computing software application for building a gaming application product.

FIG. 17 is a flow diagram showing the present invention integrated with a computing software application for building a gaming application product. The present invention provides the user with music genre and sound design menus in order to access and stream appropriate audio blocks for the creative generation and manipulation through destructive mixing and editing, for the creation of unique and original musical cues or sound design audio events. In addition this will allow the user to pre determine audio event settings to allow the further manipulation of the audio blocks during game play in real time. So that all sound design and musical events can be affected to cause additional instant original composition generation events both musical and sound design in actual real time game play, all based on predetermined program values set out in the engine by the user.

Figure 18:
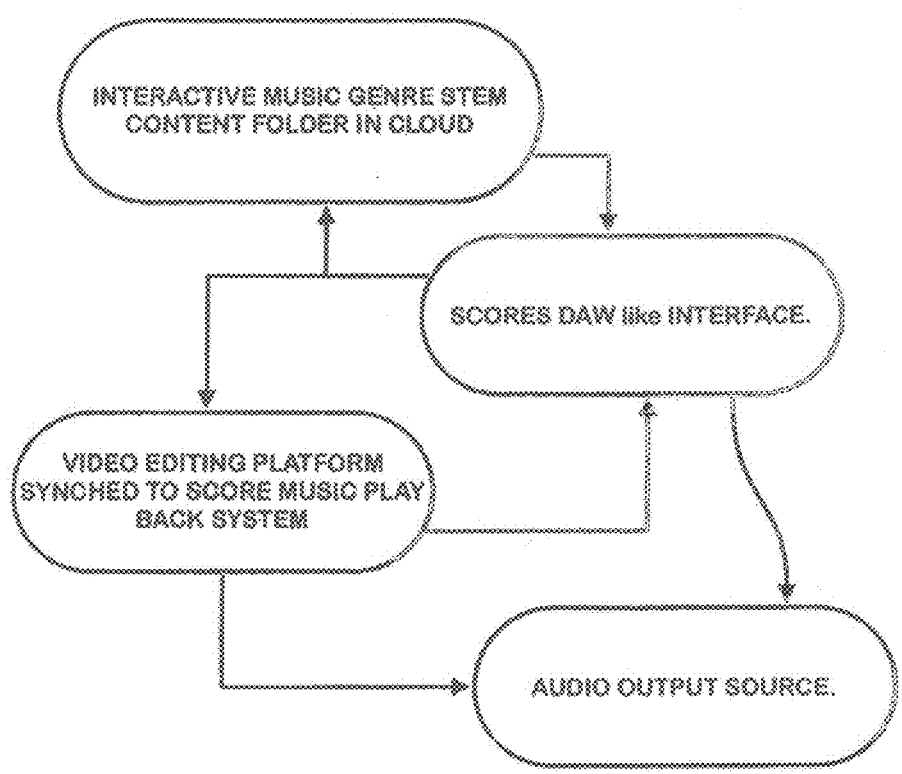
FIG. 18 is a block diagram showing the present invention integrated as a plug-in or add-on for a digital audio workstation.

FIG. 18 is a flow diagram showing the present invention integrated as a plug-in or add-on for a digital audio workstation. The purpose of the DAW like interface is to provide the user with music genre and sound design menus in order to access and stream appropriate audio blocks for the creative generation and manipulation through destructive mixing and editing tools for the creation of unique and audio files and sound design audio tracks.

Figure 19:
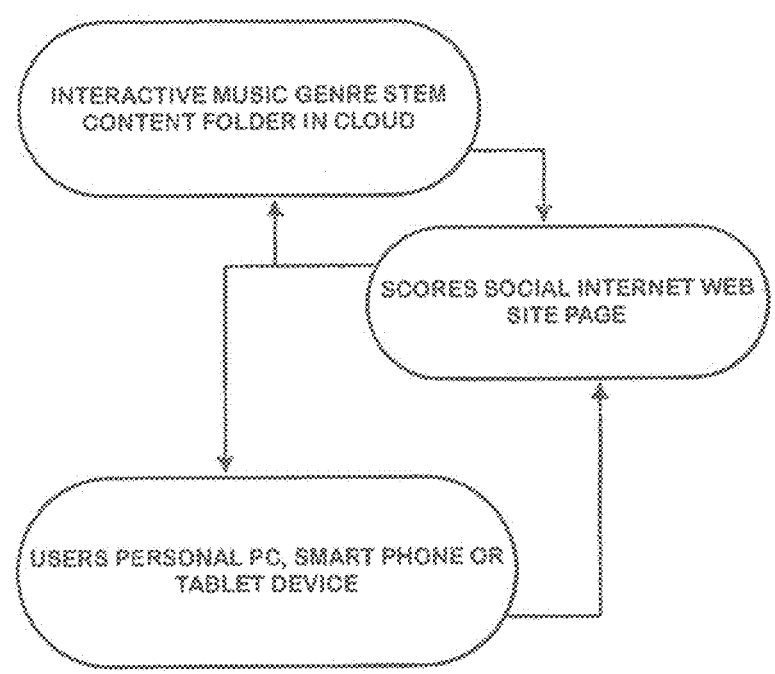
FIG. 19 is a block diagram showing the present invention integrated with a social network site.

FIG. 19 is a flow diagram showing the present invention integrated with a social network site to provide a streaming social network site interface. For the purpose of website style, the user interface via which members can access and generate content to generate and destructively edit generated original audio files with the sole purpose of adding additional musical and vocal content from an external source in order to achieve an original audio file. This original song or audio file work is held on the systems social network interface and can be shared with other members of that network. The social network site has a billboard chart with the sole purpose of rating and ranking such original song works publicly to all social network members.

The present invention provides a software application that may be plugged into a host program, such as UNITY or AVID, which are examples of programs typically used by game developers or film producers.

A music genre or category is selected by the user from a menu and an audio file offering is automatically generated. The audio file offering contains a number of audio blocks or stems of instrument performances and is then ready for audition in the game. Some or all audio block content may be replaced through a shuffle button system until the desired content starts to emerge. If, for example, the audio file is not suitable as an arrangement, but the piano audio block sounds ideal, then the user may hold the piano stem. The system Holds the piano stem and regenerates the remaining stems with alternative selections. This process can be repeated. The piano audio block will remain in place while all other audio block elements continue to change until an ideal arrangement of the chosen genre cue is achieved. The system allows for further editing possibilities such as fx and tools for a final mix.

When it is decided by the developer that the soundtrack works to the satisfaction of the game, film score, TV commercial or whatever application is intended then a license fee and agreement is set out between the system and the developer. This is done on the fly within the system. When the license is paid, a stereo file of the music work is available for download to the developers system for final placement in the film, TV program or game. The final audio file is given a registered title by the user and the authors of that music work are deemed to be, the composers of the audio blocks combined in the audio file and the project developer or user, as they have been creatively involved in the arranged music work. Each audio block carries a unique identifier as a registration number and it is with these identifiers the software restricts this audio combination or anything close from ever recurring thus deeming the piece of music unique and original to that film or game project. The original audio blocks are returned to the collective for use in future unrelated arrangements.

The present invention integrates into mainstream professional game audio development platforms in a familiar and frictionless way, such as a plug-in to Unity3D, Final Cut Pro and the like.

The present invention includes wizard-like functions allow a user to quickly search and audition specially-curated audio collections in stem/audio block formats. Audio content is optionally delivered via a cloud-based library with a database of meta-data to facilitate intelligent search, shuffle etc. The present invention provides a range of edit/mix functions similar to those used in typical Digital Audio Workstations, allowing the user to easily tweak the production in familiar ways The present invention delivers a rendered audio file to the user and deliver relevant data to the cloud-based "audio accounting" back end to guarantee the audio file production's uniqueness.

The following describes a use case for the present invention. A user is doing some game visuals productions in his favorite production environment and wants to do some audio work. The user activates the present invention plug-in and makes initial wizard-driven creative choices based on desired theme, mood, genre etc. The present invention delivers a set of audio files into a DAW-style environment. The user auditions various audio block stems. Some work straight away and these are marked "Hold". A shuffle is performed to get new audio and/or an "advanced search" to drill down deeply into the available content. With content choices made, the user previews the audio timeline and makes edits accordingly, with cut/paste, move/stretch actions. The user adjusts Mix levels, panning, sound effects and the like, using familiar actions.

When finished, the user executes a "Save & Download" action and receives a rendered audio file to his session/desktop.

The present invention is primarily a user-facing product which delivers core content/creative functionality and is operable as a software application executable in a browser, and/or as a software plug-in. Optionally, it is a plug-in to a mainstream game and video production environment. The system optionally comprises one or more of: easy to use drag & drop interface with familiar paradigms; multiple audio tracks in "stacked" audio waveform display; independent audio controls on each: Level, Mute, Pan, FX etc; wizard-style functionality which allows user to enter/select from available themes, moods, genres etc and quickly get to audio he can hear; a shuffle function allows for rapid comparison of creative audio options on a per-track/stem basis; timeline/linear editing tools are provided e.g. Copy/Cut/Paste/Move so the User can tweak the audio against e.g. a video timeline; audio Mixer functions include typical DAW dials, faders etc as well as real-time sound effects on individual tracks/stems and/or on the overall Stereo Mix; and "One-click Render" function allows renders session as flattened audio file and delivers it as a download/save to the user's computer.

The back end is a cloud-based component which drives content management/delivery functions, optionally including one or more of: mature, proven third-party cloud infrastructure chosen to aid rapid application development, e.g. Amazon S3; high levels of service guarantee; automatically scales: go from 10 Users and 100 audio files to 1,000 Users and 100,000 audio files automatically and get billed accordingly; stores audio files uploaded by content creators, along with meta-data to facilitate the "intelligent" features e.g. Search, Shuffle, "You might also like" etc; the captured/stored audio meta-data and tagging means to allow the system to ensure that each users audio file set, edits and mix settings are a unique production.

The present invention includes a Content Creator's Utility which allows the creators of content to tag and upload audio files to become available to other users of the system.

Aspects of the present invention have been described by way of example only and it should be appreciate that additions and/or modifications may be made thereto without departing from the scope thereof as defined in the appended claims.

The invention claimed is:

1. One or more non-transitory computer readable storage media containing instructions for generating an audio output file, wherein, when executed, the instructions cause one or more processors to:
   receive audio parameters that comprise a harmonic map and at least one of a tempo, a genre, or a mood;
   automatically select a unique subset of audio blocks from a group of audio blocks based on the audio parameters and at least one unique identifier associated with a selected audio block,
      wherein each audio block in the group of audio blocks comprises a portion of audio content from a respective audio track, and
      wherein each audio track comprises prerecorded audio content; and
   generate the audio output file based on the subset of audio blocks.

2. The one or more non-transitory computer readable storage media of claim 1, wherein the audio output file comprises a MIDI output file.

3. The one or more non-transitory computer readable storage media of claim 1, wherein audio blocks in the group of audio blocks are derived from one or more musical performances.

4. The one or more non-transitory computer readable storage media of claim 1, wherein the one or more processors are further configured to adapt at least one audio block for the audio output file.

5. The one or more non-transitory computer readable storage media of claim 4, wherein the at least one audio block that is adapted for the audio output file is adapted based on one or more of the audio parameters.

6. The non-transitory computer readable storage media of claim 1, wherein the one or more processors are further configured to:
   receive instructions to modify an audio parameter of the audio output file; and
   modify the audio parameter of the audio output file to generate a modified audio output file.

7. The one or more non-transitory computer readable storage media of claim 1, wherein the one or more processors are further configured to use the audio output file to generate additional audio blocks.

8. The one or more non-transitory computer readable storage media of claim 1, wherein the one or more processors are further configured to incorporate vocals into the audio output file.

9. The one or more non-transitory computer readable storage media of claim 8, wherein the vocals are generated using an interface of a social network.

10. The one or more non-transitory computer readable storage media of claim 9, wherein the one or more processors are further configured to share the audio output file with users of the social network.

11. The one or more non-transitory computer readable storage media of claim 10, wherein the audio output file is added to a billboard chart based on a ranking by the users of the social network.

12. The one or more non-transitory computer readable storage media of claim 1, wherein each audio block in the group of audio blocks corresponds to a musical instrument.

13. The one or more non-transitory computer readable storage media of claim 12, wherein the group of audio blocks is stored according to the musical instrument corresponding to each audio block in the group of audio blocks.

14. The one or more non-transitory computer readable storage media of claim 1, wherein each audio block in the group of audio blocks is associated with an author of the audio content, and
   wherein the one or more processors are further configured to associate the audio output file with the respective authors of the unique subset of audio blocks.

15. The one or more non-transitory computer readable storage media of claim 1, wherein the prerecorded audio content of each audio track includes audio content from at least one of:
   one or more musical instrument performances, or
   one or more vocal performances.

16. The one or more non-transitory computer readable storage media of claim 1, wherein the audio parameters include the harmonic map and the tempo.

17. The one or more non-transitory computer readable storage media of claim 1, wherein the audio parameters include the harmonic map and the genre.

18. The one or more non-transitory computer readable storage media of claim 1, wherein the audio parameters include the harmonic map and the mood.

19. One or more non-transitory computer readable storage media containing instructions for generating an audio output file, wherein, when executed, the instructions cause one or more processors to:
generate audio parameters that comprise at least one of a tempo, a genre, or a mood; and
provide the audio output file,
wherein:
the audio output file includes a unique subset of audio blocks from a group of audio blocks,
the unique subset of audio blocks has been automatically selected based on the audio parameters, a harmonic map, and at least one unique identifier associated with a selected audio block,
each audio block in the group of audio blocks comprises a portion of audio content from a respective audio track, and
each audio track comprises prerecorded audio content.

20. The one or more non-transitory computer readable storage media of claim 19, wherein the audio output file comprises a MIDI output file.

21. The one or more non-transitory computer readable storage media of claim 19, wherein audio blocks in the group of audio blocks are derived from one or more musical performances.

22. The one or more non-transitory computer readable storage media of claim 19, wherein the unique subset of audio blocks includes at least one audio block that is adapted for the output file.

23. The one or more non-transitory computer readable storage media of claim 22, wherein the at least one audio block that is adapted for the audio output file has been adapted based on one or more of the audio parameters or the harmonic map.

24. The one or more non-transitory computer readable storage media of claim 19, wherein the one or more processors are further configured to generate instructions to modify an audio parameter of the audio output file; and receive a modified output file having the audio parameter of the audio output file modified.

25. The one or more non-transitory computer readable storage media of claim 19, wherein the one or more processors are further configured to incorporate vocals into the audio output file.

26. The one or more non-transitory computer readable storage media of claim 25, wherein the vocals are generated using an interface of a social network.

27. The one or more non-transitory computer readable storage media of claim 26, wherein the one or more processors are further configured to cause the audio output file to be shared with users of the social network.

28. The one or more non-transitory computer readable storage media of claim 27, wherein the audio output file is added to a billboard chart based on a ranking by the users of the social network.

29. The one or more non-transitory computer readable storage media of claim 19, wherein each audio block in the group of audio blocks corresponds to a musical instrument.

30. The one or more non-transitory computer readable storage media of claim 19, wherein the prerecorded audio content of each audio track includes audio content from at least one of:
one or more musical instrument performances, or
one or more vocal performances.

* * * * *